(12) United States Patent
Scholl et al.

(10) Patent No.: US 11,321,689 B2
(45) Date of Patent: May 3, 2022

(54) SYSTEM AND METHOD FOR SECURELY TRANSACTING OVER A LANDLINE

(71) Applicant: MASTERCARD INTERNATIONAL INCORPORATED, Purchase, NY (US)

(72) Inventors: Christopher T. Scholl, Saint Peters, MO (US); James W. Barkhurst, Fenton, MO (US); Shawn Mehrhoff, Saint Ann, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 192 days.

(21) Appl. No.: 16/601,115

(22) Filed: Oct. 14, 2019

(65) Prior Publication Data
US 2021/0110364 A1    Apr. 15, 2021

(51) Int. Cl.
G06Q 20/16    (2012.01)
G06Q 20/42    (2012.01)
G06Q 20/36    (2012.01)

(52) U.S. Cl.
CPC ......... *G06Q 20/16* (2013.01); *G06Q 20/3672* (2013.01); *G06Q 20/3674* (2013.01); *G06Q 20/42* (2013.01)

(58) Field of Classification Search
None
See application file for complete search history.

(56) References Cited

U.S. PATENT DOCUMENTS 8,352,362 B2    1/2013    Mohsenzadeh
8,447,691 B2    5/2013    Kwong Hin Sang
(Continued)

FOREIGN PATENT DOCUMENTS

EP    2764484 A1    8/2014
WO    2009108066 A1    9/2009
(Continued)

OTHER PUBLICATIONS

Lipman receives order from EasyNolo; shipments of NURIT 8320 landline terminals to commence during Q1 2005. (Mar. 14, 2005). Business Wire Retrieved from https://dialog.proquest.com/professional/docview/445460064?accountid=131444 on Dec. 9, 2021 (Year: 2005).*

*Primary Examiner* — Kito R Robinson
(74) *Attorney, Agent, or Firm* — Armstrong Teasdale LLP

(57) ABSTRACT

A computing device for securely transacting over a landline is provided. The computing device is configured to receive, through a landline, from a merchant in response to a transaction request by a user, a merchant identification message including a merchant identifier, extract the merchant identifier from the merchant identification message, query a database of merchant data including a plurality of merchants and a plurality of merchant identifiers, identify, in response to the query, the merchant by matching the extracted merchant identifier against the plurality of merchant identifiers in the database, retrieve, in response to successfully identifying the merchant, a token associated with a PAN of the user, generate a token message including the token, transmit the token message to the merchant through the landline, and receive, from a payment processor, a confirmation message indicating a payment using the PAN was made in response to the merchant receiving the token.

20 Claims, 6 Drawing Sheets

(56) References Cited

U.S. PATENT DOCUMENTS

| | | | |
|---|---|---|---|
| 8,459,560 B1* | 6/2013 | Mineo-Goggin | G02B 5/32 |
| | | | 235/487 |
| 8,930,699 B2 | 1/2015 | Guo et al. | |
| 9,183,552 B2 | 11/2015 | Kauniskangas et al. | |
| 9,489,672 B1 | 11/2016 | Poole et al. | |
| 2004/0132500 A1* | 7/2004 | Rogalski | H04W 84/14 |
| | | | 455/569.1 |
| 2007/0050871 A1 | 3/2007 | Mashhour et al. | |
| 2008/0177661 A1* | 7/2008 | Mehra | G06Q 20/305 |
| | | | 705/44 |
| 2011/0251910 A1* | 10/2011 | Dimmick | G06Q 20/322 |
| | | | 705/17 |
| 2012/0278236 A1* | 11/2012 | Jain | G06Q 20/385 |
| | | | 705/44 |
| 2013/0159170 A1* | 6/2013 | Gandhi | G06Q 40/02 |
| | | | 705/39 |
| 2014/0108252 A1* | 4/2014 | Itwaru | G06Q 20/3276 |
| | | | 705/44 |
| 2014/0302814 A1 | 10/2014 | Roncoroni et al. | |
| 2015/0178718 A1 | 6/2015 | Liu et al. | |
| 2018/0150845 A1 | 5/2018 | Tonini | |

FOREIGN PATENT DOCUMENTS

| | | |
|---|---|---|
| WO | 2012003842 A1 | 1/2012 |
| WO | 2015154560 A1 | 10/2015 |

* cited by examiner

SYSTEM AND METHOD FOR SECURELY TRANSACTING OVER A LANDLINE

BACKGROUND

This disclosure relates generally to security in card payments, and more specifically, to a system and method for securely making a payment using a payment card over a landline.

Individuals sometimes make payments remotely to, for example, a merchant or a charitable organization. Many individuals prefer to make these remote payments using a landline telephone due to the familiarity and simplicity of use of the landline telephone. To make such remote payments, the individual may use a payment card, for example, by providing a primary account number (PAN) associated with the payment card to the merchant or charitable organization. Making a remote payment using a landline requires the individual to verbally read the PAN to a representative through the telephone. However, making a payment in this manner may provide a fraudster an opportunity to steal the PAN.

For example, a party purporting to be a merchant or charitable organization may in fact be a fraudster. Because an individual making a payment over a landline cannot determine the identity of the one with whom the individual is talking with certainty, the individual may provide the PAN to an unintended party. For example, an individual believing the fraudster to be a representative of a legitimate merchant or charitable organization may provide a PAN to the fraudster.

Even if the merchant or charitable organization is legitimate, it is possible for the PAN to be intercepted by a fraudster while being transmitted from the individual to the merchant or charitable organization. For example, because the individual making the payment must read the PAN aloud to communicate the PAN to the merchant or charitable organization over the landline, a fraudster may overhear the PAN at either end of the landline.

At least some known systems use security measures such as tokenization and encryption to prevent the compromising of a PAN during transmission from an individual making a payment to the party receiving the payment. However, current systems do not allow for these security measures to be used when making a payment over a landline. It is therefore desirable for a system to enable a more secure transaction over a landline.

BRIEF DESCRIPTION

In one aspect, a computing device for securely transacting over a landline is provided. The computing device includes at least one processor and a memory device in communication with the at least one processor. The at least one processor is configured to receive, through a landline, from a merchant in response to a transaction request by a user, a merchant identification message including a merchant identifier. The at least one processor is further configured to extract the merchant identifier from the merchant identification message. The at least one processor is further configured to query a database of merchant data including a plurality of merchants and a plurality of merchant identifiers, wherein each of the plurality of merchant identifiers corresponds to one of the plurality of merchants. The at least one processor is further configured to identify, in response to the query, the merchant by matching the extracted merchant identifier against the plurality of merchant identifiers in the database. The at least one processor is further configured to retrieve, in response to successfully identifying the merchant, a token associated with a primary account number (PAN) of the user. The at least one processor is further configured to generate a token message including the token. The token message is transmittable through the landline. The at least one processor is further configured to transmit the token message to the merchant through the landline. The at least one processor is further configured to receive, from a payment processor, a confirmation message indicating a payment using the PAN was made in response to the merchant receiving the token.

In another aspect, a computer-implemented method for securely transacting over a landline is provided. The computer-implemented method is implemented by a tokenization, analysis, and encryption (TAE) computing device including at least one processor in communication with a memory device. The computer-implemented method includes receiving, by the TAE computing device, through a landline, from a merchant in response to a transaction request by a user, a merchant identification message including a merchant identifier. The computer-implemented method also includes extracting, by the TAE computing device, the merchant identifier from the merchant identification message. The computer-implemented method also includes querying, by the TAE computing device, a database of merchant data including a plurality of merchants and a plurality of merchant identifiers, wherein each of the plurality of merchant identifiers corresponds to one of the plurality of merchants. The computer-implemented method also includes identifying, by the TAE computing device, in response to the query, the merchant by matching the extracted merchant identifier against the plurality of merchant identifiers in the database. The computer-implemented method also includes retrieving, by the TAE computing device, in response to successfully identifying the merchant, a token associated with a primary account number (PAN) of the user. The computer-implemented method also includes generating, by the TAE computing device, a token message including the token. The token message is transmittable through the landline. The computer-implemented method also includes transmitting, by the TAE computing device, the token message to the merchant through the landline. The computer-implemented method also includes receiving, by the TAE computing device, from a payment processor, a confirmation message indicating a payment using the PAN was made in response to the merchant receiving the token.

In yet another aspect, a non-transitory computer-readable media having computer-executable instructions embodied thereon is provided. When executed by a tokenization, analysis, and encryption (TAE) computing device including at least one processor in communication with a memory device, the computer-readable instructions cause the TAE computing device to receive, through a landline, from a merchant in response to a transaction request by a user, a merchant identification message including a merchant identifier. The computer-readable instructions further cause the TAE computing device to extract the merchant identifier from the merchant identification message. The computer-readable instructions further cause the TAE computing device to query a database of merchant data including a plurality of merchants and a plurality of merchant identifiers, wherein each of the plurality of merchant identifiers corresponds to one of the plurality of merchants. The computer-readable instructions further cause the TAE computing device to identify, in response to the query, the merchant by matching the extracted merchant identifier against the plurality of merchant identifiers in the database. The computer-readable instructions further cause the TAE computing device to retrieve, in response to successfully identifying the merchant, a token associated with a primary account number (PAN) of the user. The computer-readable instructions further cause the TAE computing device to generate a token message including the token. The token message is transmittable through the landline. The computer-readable instructions further cause the TAE computing device to transmit the token message to the merchant through the landline. The computer-readable instructions further cause the TAE computing device to receive, from a payment processor, a confirmation message indicating a payment using the PAN was made in response to the merchant receiving the token.

DETAILED DESCRIPTION

Figure 1:
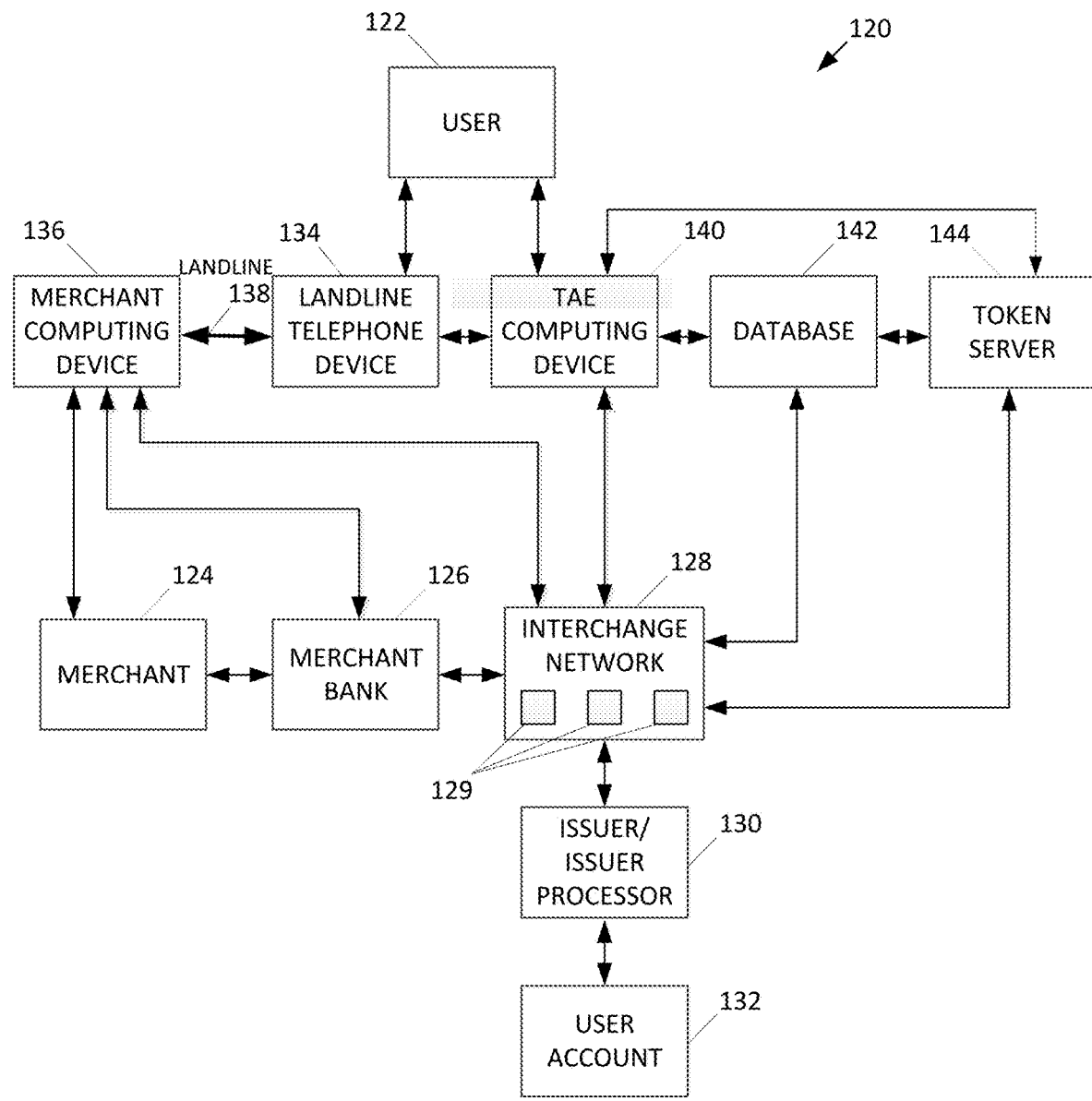
FIG. 1 is a schematic diagram illustrating an example multi-party payment processing system for enabling secure payment-by-card transactions over a landline.

The following detailed description illustrates embodiments of the disclosure by way of example and not by way of limitation. The description enables one skilled in the art to make and use the disclosure, describes several embodiments, adaptations, variations, alternatives, and uses of the disclosure, including what is presently believed to be the best mode of carrying out the disclosure. The disclosure is described as applied to an example embodiment, namely, systems and methods utilizing a tokenization, analysis, and encryption (TAE) computing device. The TAE computing device may be in communication with a payment processor computing device and a tokenization server computing device.

The TAE computing device includes a processor in communication with a memory. The TAE computing device is further in communication with at least one database for storing information, such as merchant data. The TAE computing device is further in communication with a landline telephone device such that the TAE computing device can communicate with at least one merchant computing device over a landline. When a telephone call is connected between the merchant computing device and the landline telephone device, information (e.g., audio signals) can be transferred between the landline telephone device and the merchant computing device. For example, a user may use the landline telephone device to speak with a merchant representative who is using the merchant computing device. Because the TAE computing device is communicatively coupled to the landline telephone device, the TAE computing device may receive and analyze audio signals (e.g., speech, frequency shift keying (FSK) signals, or touchtone signals) transmitted over the landline by the merchant computing device.

In the example embodiment, the TAE computing device is configured to receive a merchant identification message including a merchant identifier. The merchant identifier may be a unique identifier (e.g., a number or alphanumeric code) associated with the merchant. The merchant computing device may generate the merchant identification message by encrypting the merchant identifier into an audio signal that can be transmitted over the land line. For example, the merchant identifier may be encrypted using FSK, where the merchant identifier is converted to digital (e.g., binary) values, and each digital value is assigned an audio frequency. A sequence of audio frequencies corresponding to the digital values of the merchant identifier may then be transmitted over the landline. The TAE computing device may then receive the sequence of audio frequencies. In another example, the merchant identifier may be encrypted as dual-tone multi-frequency (DTMF) signals (e.g., touchtone signals). The merchant identifier may be converted to number values corresponding to touchtone digits, each with an associated two-frequency audio signal (e.g., each touchtone digit has a unique combination of frequencies). A sequence of touchtone signals corresponding to the digits of the merchant identifier may then be transmitted over the landline. The TAE computing device may then receive the sequence of touchtone signals. In other examples, the merchant identification message may be another type of audio signal (e.g., natural or synthesized speech) that can be interpreted by the TAE computing device.

The TAE computing device is further configured to extract the merchant identifier from the merchant identification message. For example, in embodiments where the merchant identification message uses an FSK protocol, the TAE computing device may analyze each frequency of a received sequence of audio frequencies to determine a sequence of digital (e.g., binary) values corresponding to the received sequence of frequencies. The TAE computing device may then decrypt the determined binary sequence to extract the merchant identifier. In another example, in embodiments where the merchant identification message uses a touchtone protocol, the TAE computing device may analyze each touchtone signal of a received sequence of touchtone signals to determine a sequence of digits corresponding to the received sequence of touchtone signals. The TAE computing device may then decrypt the determined sequence of digits to extract the merchant identifier.

The TAE computing device may be further configured to query a database based on the extracted merchant identifier. The database includes merchant data including a plurality of merchant names and a plurality of merchant identifiers, where each merchant identifier is associated with a merchant name. Each merchant name and corresponding merchant identifier may correspond to a merchant deemed to be legitimate. For example, the merchant data may include only the names of merchants and charitable organizations that have enrolled in the system or otherwise been verified. The database may be associated with, for example, a payment processor or another entity managing the system.

The TAE computing device is further configured to identify the merchant based on the result from the query. If the extracted merchant identifier matches one of the plurality of merchant identifiers, the TAE computing device may determine (i) that the merchant from which the identifier was received is legitimate and (ii) the merchant name associated with the merchant. In certain embodiments, the TAE computing device may display the merchant name associated with the extracted merchant identifier, enabling the user to verify the identity of the merchant in real time.

The TAE computing device is further configured to retrieve a token. The token may be retrieved automatically in response to successfully identifying the merchant associated with extracted merchant identifier. The token may correspond to a primary account number (PAN) associated with a payment card of the user. The token and associated PAN may be known by a payment processor, such that a payment processor receiving the token can determine the PAN associated with the token. The token may expire, for example, after one use, so that the token cannot be used to make additional purchases if a fraudster were to intercept the token. The token may be generated, for example, by a token server in communication with the TAE computing device and the payment processor. When a token is received by the payment processor, the payment processor may communicate with the token server to determine the PAN corresponding to the token. In certain embodiments, the token server may be associated with the payment processor. In alternative embodiments, the token may be generated by the TAE computing device and communicated to the payment processor prior to or during the transaction.

The TAE computing device is further configured to generate a token message including the token. The token message may be formatted such that it may be transmitted over the landline (e.g., as an audio signal). For example, the token message may use an FSK protocol. The TAE computing device may encrypt the token into a sequence of digital (e.g., binary) values, where each binary value corresponds to an audio frequency. In another example, the token message may use a touchtone protocol. The TAE computing device may encrypt the token into a sequence of digits, where each digit corresponds to a touchtone signal (e.g., each digit has a unique combination of frequencies). In other examples, the token message may be another type of audio signal (e.g., natural or synthesized speech) that can be interpreted by the merchant computing device. In some embodiments, the TAE computing device may encrypt the token multiple times for additional security. For example, the token may be encrypted into an alternative numeric or alphanumeric value using an encryption protocol before being encrypted into an audio signal. The encrypted token may be decrypted by, for example, the payment processor, so that the merchant is not exposed to the token in an unencrypted form.

The TAE computing device is further configured to transmit the token message to the merchant through a landline. For example, the TAE computing device may generate an audio signal corresponding to the token message using a loudspeaker. The audio signal may be received by a microphone of a receiver of the landline telephone device and transmitted over the landline. In another example, the TAE computing device and the landline telephone device are capable of wireless digital communication (e.g., using Bluetooth). The TAE computing device may transmit the token message to the landline telephone device as a digital audio signal (e.g., using a Bluetooth protocol). The landline computing device may then convert the digital audio signal to an analog audio signal (e.g., corresponding to an FSK or touchtone signal) to transmit the analog audio signal over the landline.

The merchant computing device may receive the audio signal transmitted over the landline corresponding to the token message. The merchant computing device may extract the token from the token message by decrypting the token message. The merchant computing device may then use the token to initiate a payment card transaction. The merchant computing device may communicate with the payment processor (e.g., through a merchant bank or third party processor). The payment processor may access the token server to determine the PAN associated with the token. Thus, the transaction may be completed without the PAN being communicated over the landline.

The TAE computing device is further configured to receive a confirmation message. The message may be generated and transmitted, for example, by the payment processor. The message may include, for example, a merchant name and payment amount associated with the transaction. In certain embodiments, the TAE computing device may display the received merchant name and payment amount, enabling the user to verify the merchant and payment amount in real time.

The technical problems addressed by the disclosure include at least one of: (i) inability of a user to verify in real time the identity of a merchant with whom the user is speaking during a landline telephone call; (ii) necessity of a user to verbally read the user's primary account number (PAN) during a telephone call in order to use a payment card to make a payment over the telephone; (iii) inability to tokenize and/or encrypt a PAN being communicated over a landline; and (iv) inability to verify a merchant and payment amount in real time for a payment made through a landline telephone call.

The technical effects achieved by the systems and methods described herein include at least one of: (i) receiving, through a landline, from a merchant in response to a transaction request by a user, a merchant identification message including a merchant identifier; (ii) extracting the merchant identifier from the merchant identification message; (iii) querying a database of merchant data including a plurality of merchants and a plurality of merchant identifiers, wherein each of the plurality of merchant identifiers corresponds to one of the plurality of merchants; (iv) identifying, in response to the query, the merchant by matching the received merchant identifier against the plurality of merchant identifiers in the database; (v) retrieving, in response to successfully identifying the merchant, a token associated with a PAN of the user; (vi) generating a token message including the token, the token message transmittable through the landline; (vii) transmitting the token message to the merchant through the landline; and (viii) receiving, from a payment processor, a confirmation message indicating a payment using the PAN was made in response to the merchant receiving the token.

The resulting technical benefits achieved by the systems and methods of the disclosure include at least one of: (i) enabling a user to verify in real time the identity of a merchant with whom the user is speaking during a landline telephone call; (ii) enabling a user to make a card payment through a landline telephone call without requiring the user to verbally read the user's primary account number (PAN) during the call; (iii) enabling tokenization and/or encryption of a PAN being communicated over a landline; and (iv) enabling a user to verify a merchant and payment amount in real time for a payment made through a landline telephone call.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, Smartphones, personal digital assistants (PDAs), key fobs, and/or computers. Each type of transactions card can be used as a method of payment for performing a transaction.

In one embodiment, a computer program is provided, and the program is embodied on a computer readable medium. In an example embodiment, the system is executed on a single computer system, without requiring a connection to a server computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, Calif.). In yet a further embodiment, the system is run on a Mac OS® environment (Mac OS is a registered trademark of Apple Inc. located in Cupertino, Calif.). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer readable medium and utilizes a Structured Query Language (SQL) with a client user interface front-end for administration and a web interface for standard user input and reports. In another embodiment, the system is web enabled and is run on a business-entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Wash.). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.).

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

Figure 2:
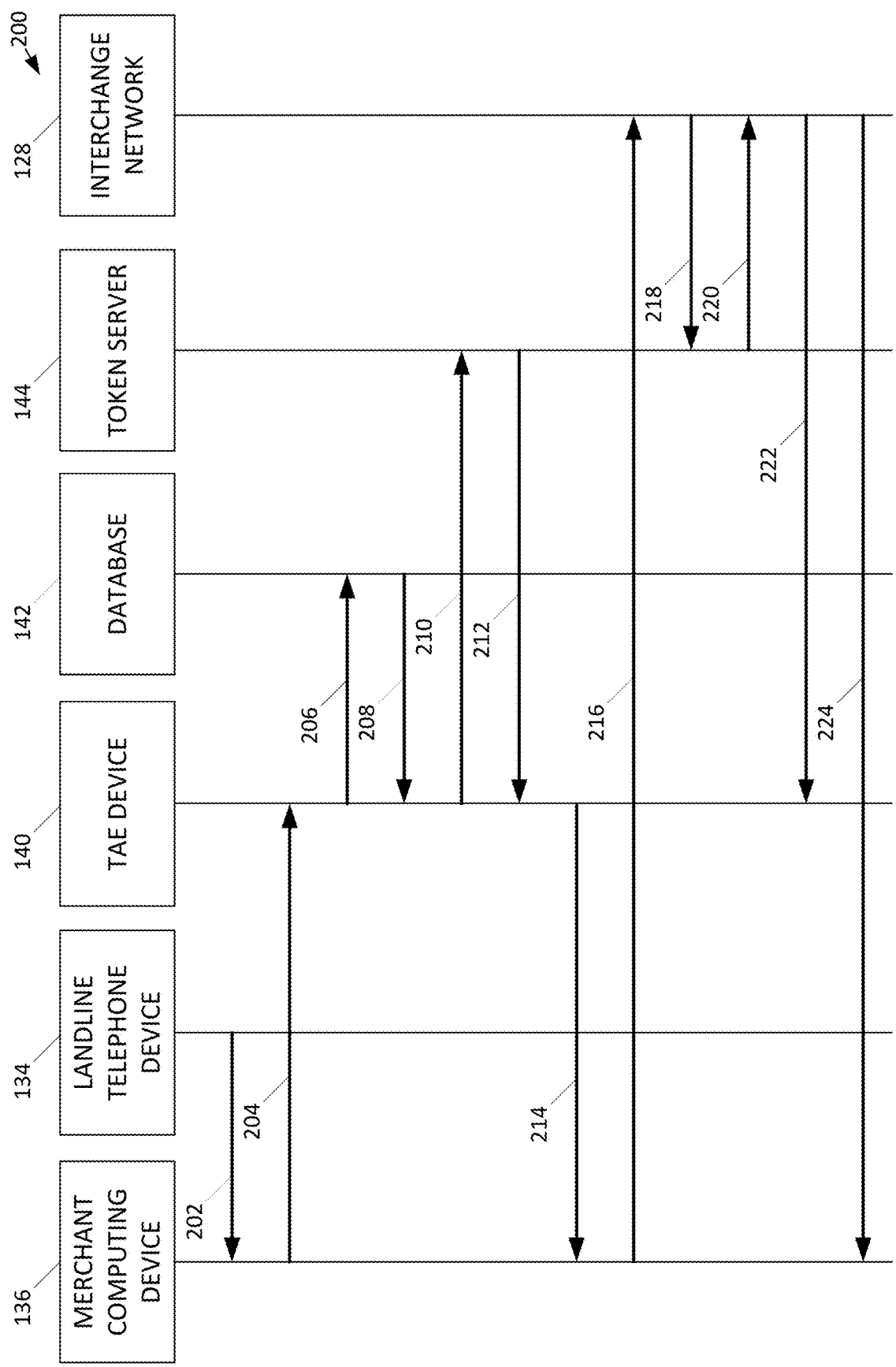
FIG. 2 is a data flow diagram illustrating an example data flow among elements of the system shown in FIG. 1.

FIG. 1 is a schematic diagram illustrating an example system 120 for enabling payment-by-card transactions. FIG. 2 is a data flow diagram illustrating an example data flow 200 among elements of the system shown in FIG. 1. Embodiments described herein may relate to a transaction card system, such as a credit card payment system using the Mastercard® interchange network. The Mastercard® interchange network is a set of proprietary communications standards promulgated by Mastercard International Incorporated® for the exchange of financial transaction data and the settlement of funds between financial institutions that are members of Mastercard International Incorporated®. (Mastercard is a registered trademark of Mastercard International Incorporated located in Purchase, N.Y.).

As described with respect to system 120, a financial institution called the "issuer" 130 issues a transaction card or electronic payments account identifier, such as a credit card or debit card associated with user account 132, to a consumer, cardholder, or user 122, who uses the transaction card to tender payment for a purchase from a merchant 124.

In example embodiments, user 122 may use the transaction card to tender payment over a landline telephone call, where user 122 communicates via an audio signal 202 through a landline telephone device 134 connected to a merchant computing device 136 via a landline 138. A tokenization, analysis, and encryption (TAE) device 140 may be in communication with landline telephone device 134 such that TAE computing device 140 is capable of receiving and transmitting, or causing landline telephone device 134 to transmit, audio signals to merchant computing device 136 via landline 138. TAE computing device 140 enables user 122 to verify the identity of merchant 124 and securely tender payment using the user account 132 (e.g., the transaction card) over landline 138. In response to user 122 tendering payment, merchant computing device 136 may transmit a merchant identification message 204 including a merchant identifier via landline 138, for example, using FSK, DTMF, or another suitable method as discussed in more detail below. TAE computing device 140 may receive merchant identification message 204 due to its connection to landline telephone device 134, and may extract, from the merchant identification message 204, the merchant identifier. TAE computing device may query 206 a database 142 based on the extracted merchant identifier. The database 142 includes merchant data including a plurality of merchant names and a plurality of merchant identifiers. Each merchant identifier corresponds to one of the plurality of merchants. Query 206 may return 208 the name of merchant 124 from database 142 by comparing the received merchant identifier to the plurality of merchant identifiers. Thus, TAE computing device 140 may enable user 122 to confirm the identity of merchant 124 in real time and verify that merchant 124 is legitimate.

In the example embodiment, in response to successfully identifying merchant 124 as a merchant in the database, TAE computing device 140 may transmit a request 210 to retrieve a token 212 from token server 144. Token 212 may be associated with a primary account number (PAN) 220 associated with a payment card of user 122. Token 212 and associated PAN 220 may be known by interchange network 128, such that interchange network 128 can determine the PAN 220 associated with token 212 upon receiving token 212. Token 212 may expire, for example, after one use, so that token 212 cannot be used to make additional purchases if a fraudster were to intercept token 212. Token 212 may be generated, for example, by token server 144 in communication with TAE computing device 140 and interchange network 128. When token 212 is subsequently received by interchange network 128 from merchant 124 in connection with a payment transaction message submitted over interchange network 128, interchange network 128 may communicate with token server 144 to determine the PAN corresponding to token 212, and may apply PAN 220 to the payment transaction.

In response to obtaining token 212 from token server 144, TAE computing device 140 may generate a token message 214 including token 212. Token message 214 may be formatted using a protocol that can be transmitted via landline 138. TAE computing device 140 may transmit token message 214 to merchant computing device 136 via landline 138 (e.g., as an audio signal). For example, token message 214 may use an FSK protocol. TAE computing device 140 may encrypt token 212 into a sequence of digital (e.g., binary) values, where each binary value corresponds to an audio frequency. In another example, token message 214 may use a touchtone protocol. TAE computing device 140 may encrypt token 212 into a sequence of digits, where each digit corresponds to a touchtone signal (e.g., each digit has a unique combination of frequencies). In other examples, token message 214 may be another type of audio signal (e.g., natural or synthesized speech) that can be interpreted by merchant computing device 136. In some embodiments, TAE computing device 140 may encrypt token 212 multiple times for additional security. For example, token 212 may be encrypted into an alternative numeric or alphanumeric value using an encryption protocol before being encrypted into an audio signal. The encrypted token 212 may be decrypted by, for example, interchange network 128, so that merchant 124 is not exposed to token 212 in an unencrypted form.

In the example embodiment, TAE computing device 140 may be further configured to transmit token message 214 to merchant computing device 136 through landline 138. For example, TAE computing device 140 may generate an audio signal corresponding to token message 214 using a loudspeaker (not shown). The audio signal may be received by a microphone of a receiver of landline telephone device 134 and transmitted over landline 138. In another example, TAE computing device 140 and landline telephone device 134 are capable of wireless digital communication (e.g., using Bluetooth). TAE computing device 140 may transmit token message 214 to landline telephone device 134 as a digital audio signal (e.g., using a Bluetooth protocol). Landline telephone device 134 may then convert the digital audio signal to an analog audio signal (e.g., a FSK or touchtone signal) to transmit the analog audio signal over the landline. Thus, user 122 need not verbally communicate transaction card or other information associated with user account 132 (e.g., PAN 220) over landline 138, preventing such information from being overheard or otherwise intercepted.

To accept payment with the transaction card, merchant 124 must normally establish an account with a financial institution that is part of the financial payment system. This financial institution, designated as merchant bank 126 in FIG. 1, is usually called the "merchant bank," the "acquiring bank," or the "acquirer." When user 122 tenders payment for a purchase with a transaction card, merchant 124 requests authorization from merchant bank 126 for the amount of the purchase. The request may be performed over the telephone, but is usually performed through the use of a point-of-sale (POS) terminal in communication with merchant computing device 136. Merchant computing device 136 receives token message 214 from TAE computing device 140, extracts token 212 from token message 214, and electronically transmits token 212 to transaction processing computers of merchant bank 126. Alternatively, merchant bank 126 may authorize a third party to perform transaction processing on its behalf. In this case, the POS terminal will be configured to communicate with the third party. Such a third party is usually called a "merchant processor," an "acquiring processor," or a "third party processor." Merchant bank 126 or other merchant processor may include token 212 in an authorization request message 216 and transmit it to a server 129 of an interchange network 128, for example, using the proprietary communication protocol of interchange network 128.

In response to authorization request message 216, one or more servers 129 of interchange network 128 may query 218 token server 144 to retrieve the PAN 220 of user account 132 associated with token 212. In response to successfully retrieving PAN 220 of user account 132, the server 129 communicates with computers of issuer bank 130 to determine whether user account 132 associated with user 122 and identified by retrieved PAN 220 is in good standing and whether the purchase is covered by an available credit line of user account 132. For example, the server 129 of interchange network 128 modifies the authorization request message 216 by substituting retrieved PAN 220 for token 212, and forwards the authorization request message 216 to issuer bank 130. Accordingly, PAN 220 never appears on the merchant side of the transaction.

Based on the determination by issuer bank 130, the request for authorization will be declined or accepted in an authorization response message 224 forwarded by interchange network 128 from issuer bank 130 to merchant bank 126, and on to merchant computing device 136. If the request is accepted, an authorization code is issued to merchant 124 via authorization response message 224. In certain embodiments, a confirmation message 222 including the name of merchant 124 and transaction amount may be transmitted to TAE computing device 140 in response to the acceptance or declining of the authorization request. TAE computing device 140 may display the merchant name and transaction amount to user 122, enabling user 122 to verify the merchant and transaction amount in real time.

When a request for authorization is accepted, the available credit line of user account 132 is decreased. Normally, a charge for a payment card transaction is not posted immediately to user account 132 because bankcard associations, such as Mastercard International Incorporated®, have promulgated rules that do not allow merchant 124 to charge, or "capture," a transaction until goods are shipped or services are delivered. However, with respect to at least some debit card transactions, a charge may be posted at the time of the transaction. When merchant 124 ships or delivers the goods or services, merchant 124 captures the transaction by, for example, appropriate data entry procedures on the point-of-sale terminal. This may include bundling of approved transactions daily for standard retail purchases. If user 122 cancels a transaction before it is captured, a "void" is generated. If user 122 returns goods after the transaction has been captured, a "credit" is generated. Interchange network 128 and/or issuer bank 130 stores the transaction information, such as an identifier of user account 132, a category of merchant, a merchant identifier, a location where the transaction was completed, amount of purchase, and date and time of the transaction in a database.

After a purchase has been made, a clearing process occurs to transfer additional transaction data related to the purchase among the parties to the transaction, such as merchant bank 126, interchange network 128, and issuer bank 130. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction.

For debit card transactions, when a request for a personal identification number (PIN) authorization is approved by the issuer, user account 132 is decreased. Normally, a charge is posted immediately to user account 132. The payment card association then transmits the approval to the acquiring processor for distribution of goods/services or information, or cash in the case of an automated teller machine (ATM).

After a transaction is authorized and cleared, the transaction is settled among merchant 124, merchant bank 126, and issuer bank 130. Settlement refers to the transfer of financial data or funds among merchant bank 126, issuer bank 130, and merchant 124 related to the transaction. Usually, transactions are captured and accumulated into a "batch," which is settled as a group. More specifically, a transaction is typically settled between issuer bank 130 and interchange network 128, and then between interchange network 128 and merchant bank 126, and then between merchant bank 126 and merchant 124.

In one embodiment, the one or more servers 129 of interchange network 128 includes a database server that is communicatively coupled to database 142 for storing data. In an exemplary embodiment, database 142 stores merchant data including a plurality of merchant names and a plurality of merchant identifiers, where each merchant identifier corresponds to one of the plurality of merchant names. According to the exemplary embodiment, database 142 is disposed remotely from interchange network 128. In other embodiments, database 142 is decentralized, or may be a portion of interchange network 128. In the exemplary embodiment, TAE computing device 140 is able to access database 142 by logging onto interchange network 128. In the example embodiment, interchange network 128 may be associated with a payment processor.

One or more point-of-sale (POS) systems (e.g., merchant computing device 136) may be communicatively coupled with the interchange network 128. Merchant computing device 136 may include, without limitation, components that accept card swipes, online payment portals, digital wallet payments, or stored payment card numbers for recurring transactions.

In an example embodiment, TAE computing device 140 may be communicatively coupled (e.g., either directly or indirectly) to interchange network 128 and landline telephone device 134 such that TAE computing device 140 can communicate with at least one merchant computing device such as merchant computing device 136 over landline 138. When a telephone call is connected between the merchant computing device and the landline telephone device, information (e.g., audio signal 202) can be transferred between landline telephone device 134 and merchant computing device 136. For example, user 122 may use landline telephone device 134 to speak with a merchant representative who is using merchant computing device 136. Because TAE computing device 140 is communicatively coupled to landline telephone device 134, TAE computing device 140 may receive and analyze audio signals (e.g., speech, frequency shift keying (FSK) signals, or touchtone signals) transmitted over landline 138 by merchant computing device 136.

In the example embodiment, TAE computing device 140 is configured to receive merchant identification message 204 including a merchant identifier. The merchant identifier may be a unique identifier (e.g., a number or alphanumeric code) associated with the merchant. Merchant computing device 136 may generate merchant identification message 204 by encrypting the merchant identifier into an audio signal that can be transmitted over the land line. For example, the merchant identifier may be encrypted using FSK, where the merchant identifier is converted to digital (e.g., binary) values, and each digital value is assigned an audio frequency. A sequence of audio frequencies corresponding to the digital values of the merchant identifier may then be transmitted over the landline. TAE computing device 140 may then receive the sequence of audio frequencies. In another example, the merchant identifier may be encrypted as dual-tone multi-frequency (DTMF) signals (e.g., touchtone signals). The merchant identifier may be converted to number values corresponding to touchtone digits, each with an associated two-frequency audio signal (e.g., each touchtone digit has a unique combination of frequencies). A sequence of touchtone signals corresponding to the digits of the merchant identifier may then be transmitted over the landline. TAE computing device 140 may then receive the sequence of touchtone signals. In other examples, merchant identification message 204 may be another type of audio signal (e.g., natural or synthesized speech) that can be interpreted by TAE computing device 140.

In the example embodiment, TAE computing device 140 may further be configured to extract the merchant identifier from merchant identification message 204. For example, in embodiments where merchant identification message 204 uses an FSK protocol, TAE computing device 140 may analyze each frequency of a received sequence of audio frequencies to determine a sequence of digital (e.g., binary) values corresponding to the received sequence of frequencies. TAE computing device 140 may then decrypt the determined binary sequence to extract the merchant identifier. In another example, in embodiments where merchant identification message 204 uses a touchtone protocol, TAE computing device 140 may analyze each touchtone signal of a received sequence of touchtone signals to determine a sequence of digits corresponding to the received sequence of touchtone signals. TAE computing device 140 may then decrypt the determined sequence of digits to extract the merchant identifier.

In the example embodiment, computing devices associated with one of user 122 (e.g., TAE computing device 140), merchant 124 (e.g., merchant computing device 136), merchant bank 126, and/or issuer bank 130 may be referred to herein as client systems. In some embodiments, client systems include computers configured to implement a web browser or a software application, which enables client systems to access a server system (e.g., interchange network 128) using the Internet. Client systems may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Alternatively, client systems include any device capable of accessing the Internet including, but not limited to, a desktop computer, a laptop computer, a personal digital assistant (PDA), a cellular phone, a smartphone, a tablet, a phablet, or other web-based connectable equipment.

Figure 3:
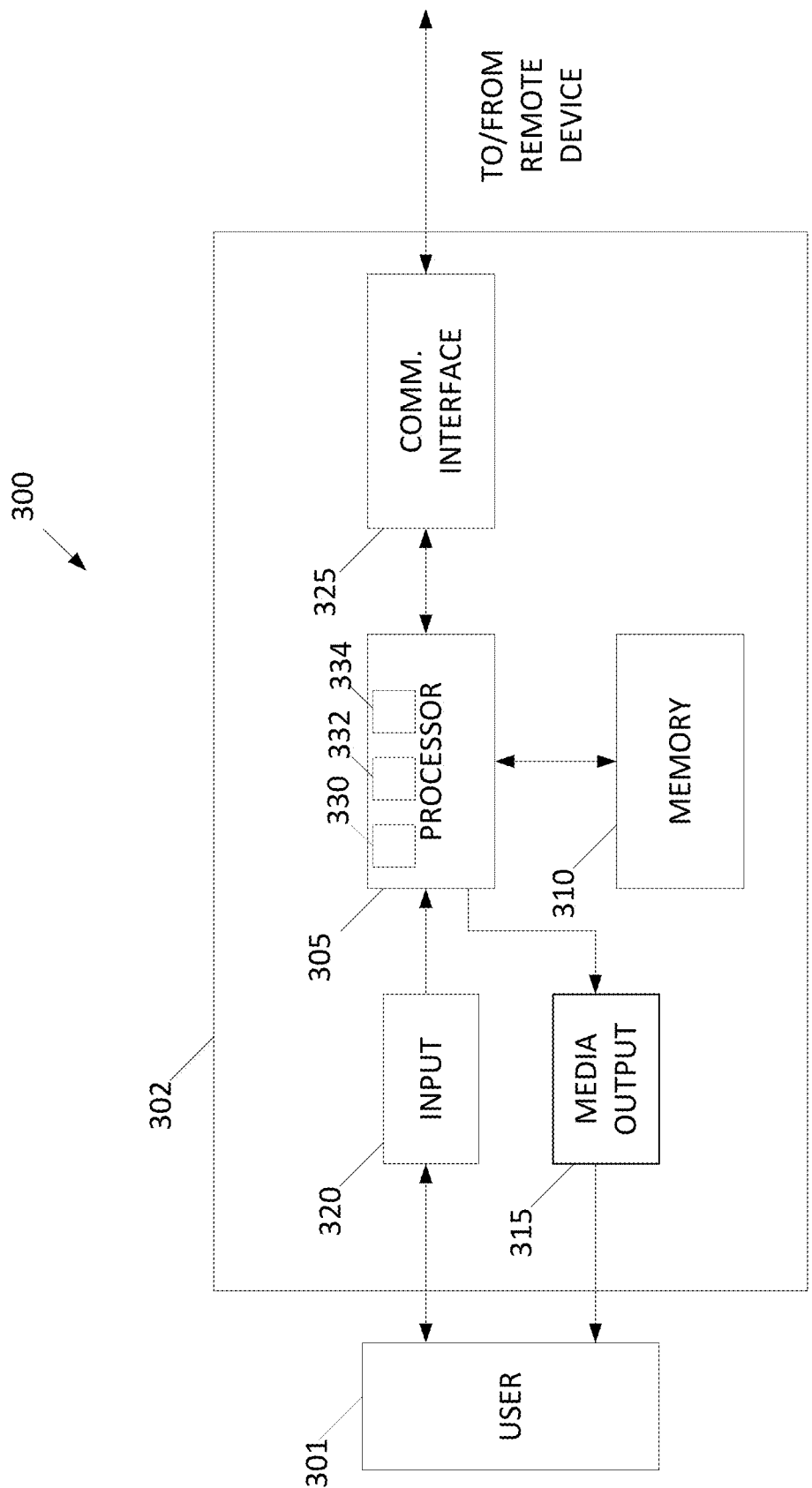
FIG. 3 illustrates an example configuration of a client system that may be used in the system shown in FIG. 1, in accordance with an embodiment of the present disclosure.

FIG. 3 illustrates an example configuration of a client system 300 in accordance with one embodiment of the present disclosure. In the example embodiment, client system 300 includes at least one user computing device 302, operated by a user 301. User 301 may include, but is not limited to, user 122 (shown in FIG. 1). User computer device 302 may include, but is not limited to, TAE computing device 140. User computer device 302 includes a processor 305 for executing instructions, and a memory area 310. In some embodiments, executable instructions are stored in memory area 310. Processor 305 may, for example, include one or more processing units (e.g., in a multi-core configuration). Memory area 310 may, for example, be any device allowing information such as executable instructions and/or transaction data to be stored and retrieved. Memory area 310 may further include one or more computer readable media.

In the example embodiment, user computer device 302 further includes at least one media output component 315 for presenting information to user 301. Media output component 315 may, for example, be any component capable of converting and conveying electronic information to user 301. For example, media output component 315 may be a display component configured to display component lifecycle data in the form of reports, dashboards, communications, and the like In some embodiments, media output component 315 includes an output adapter (not shown), such as a video adapter and/or an audio adapter, which is operatively coupled to processor 305 and operatively connectable to an output device (also not shown), such as a display device (e.g., a cathode ray tube (CRT), liquid crystal display (LCD), light emitting diode (LED) display, or "electronic ink" display) or an audio output device (e.g., a speaker or headphones).

In some embodiments, media output component 315 is configured to include and present a graphical user interface (not shown), such as a web browser and/or a client application, to user 301. The graphical user interface may include, for example, an online store interface for viewing and/or purchasing items, and/or a wallet application for managing payment information. In some embodiments, user computer device 302 includes an input device 320 for receiving input from user 301. User 301 may use input device 320 to, without limitation, select and/or enter one or more items to purchase and/or a purchase request, or to access credential information, and/or payment information. Input device 320 may include, for example, a keyboard, a pointing device, a mouse, a stylus, a touch sensitive panel, a touch pad, a touch screen, a gyroscope, an accelerometer, a position detector, an audio input device, a fingerprint reader/scanner, a palm print reader/scanner, a iris reader/scanner, a retina reader/scanner, a profile scanner, or the like. A single component such as a touch screen may function as both an output device of media output component 315 and input device 320. User computing device 302 may also include a communication interface 325, which is communicatively connectable to a remote device such as interchange network 128 (shown in FIG. 1). Communication interface 325 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 310 are, for example, computer readable instructions for providing a user interface to user 301 via media output component 315 and, optionally, receiving and processing input from input device 320. A user interface may include, among other possibilities, a web browser, and client application. Web browsers enable users, such as user 301, to display and interact with media and other information typically embedded on a web page or a website from interchange network 128. A client application allows user 301 to interact with a server application from interchange network 128. For example, instructions may be stored by a cloud service, and the output of the execution of the instructions sent to the media output component 315.

Processor 305 executes computer-executable instructions for implementing aspects of the disclosure. In some embodiments, the processor 305 is transformed into a special purpose microprocessor by executing computer-executable instructions or by otherwise being programmed. For example, the processor 305 may be programmed with computer-executable instructions such that it may execute the methods as discussed above and illustrated in FIG. 6, below.

In exemplary embodiments, processor 305 may include and/or be communicatively coupled to one or more modules for implementing the systems and methods described herein. For example, processor 305 may include a decryption module 330 for receiving, through a landline (e.g., landline 138 shown in FIG. 1), from a merchant (e.g., merchant 124 shown in FIG. 1) in response to transaction request (e.g., audio signal 202) by a user (e.g., user 122 shown in FIG. 1), merchant identification message 204 including a merchant identifier, and extracting the merchant identifier from merchant identification message 204. Processor 305 may also include a comparing module 332 for querying a database (e.g., database 142 of FIG. 1) of merchant data including a plurality of merchants and a plurality of merchant identifiers, wherein each of the plurality of merchant identifiers corresponds to one of the plurality of merchants, and identifying, in response to the query, the merchant by matching the extracted merchant identifier against the plurality of merchant identifiers in the database. Processor 305 may also include an encryption module 334 for generating token message 214, transmittable through the landline including token 212, and transmitting token message 214 to the merchant through the landline.

Figure 4:
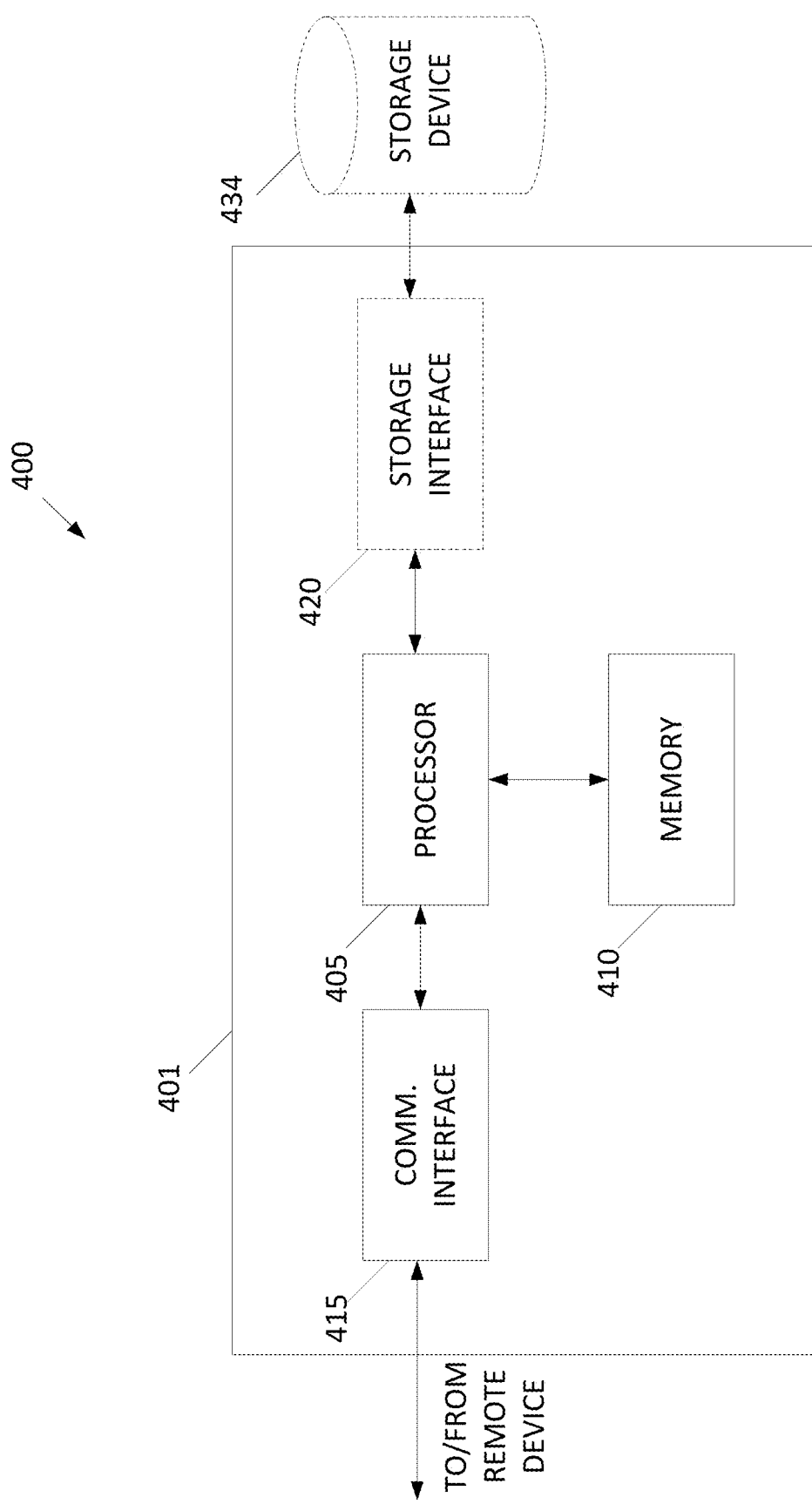
FIG. 4 illustrates an example configuration of a server system that may be used in the system shown in FIG. 1, in accordance with an embodiment of the present disclosure.

FIG. 4 illustrates an example configuration of a server system 400, such as one of servers 129 of interchange network 128 or token server 144 (shown in FIG. 1). In the example embodiment, server system 400 includes at least one server computing device 401, in electronic communication with at least one storage device 434. In the exemplary embodiment, server computing device 401 includes a processor 405 for executing instructions (not shown) stored in a memory area 410. In an embodiment, processor 405 may include one or more processing units (e.g., in a multi-core configuration) for executing instructions. The instructions may be executed within various different operating systems on the server system 400, such as UNIX®, LINUX® (LINUX is a registered trademark of Linus Torvalds), Microsoft Windows®, etc. More specifically, the instructions may cause various data manipulations on data stored in storage device 434 (e.g., create, read, update, and delete procedures). It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

In the example embodiment, processor 405 is operatively coupled to a communication interface 415 such that server system 400 is capable of communicating with a remote device such as a user system or another server system 400. For example, communication interface 415 may receive requests from client system 300 (FIG. 3) via the Internet, within the scope of the embodiment illustrated in FIG. 4.

In the example embodiment, processor 405 is also operatively coupled to a storage device 434, which may be, for example, any computer-operated hardware unit suitable for storing and/or retrieving data. In some embodiments, storage device 434 is integrated in server system 400. For example, server system 400 may include one or more hard disk drives as storage device 434. In certain embodiments, storage device 434 is external to server system 400 and is used to implement database 142 (shown in FIG. 1). For example, server system 400 may include one or more hard disk drives as storage device 434. In other embodiments, storage device 434 is external to server system 400 and may be accessed by a plurality of server systems 400. For example, storage device 434 may include multiple storage units such as hard disks or solid state disks in a redundant array of inexpensive disks (RAID) configuration. Storage device 434 may include a storage area network (SAN) and/or a network attached storage (NAS) system.

In some embodiments, processor 405 is operatively coupled to storage device 434 via a storage interface 420. Storage interface 420 may include, for example, a component capable of providing processor 405 with access to storage device 434. In an exemplary embodiment, storage interface 420 further includes one or more of an Advanced Technology Attachment (ATA) adapter, a Serial ATA (SATA) adapter, a Small Computer System Interface (SCSI) adapter, a RAID controller, a SAN adapter, a network adapter, and/or any similarly capable component providing processor 405 with access to storage device 434.

Memory area 410 may include, but is not limited to, random-access memory (RAM) such as dynamic RAM (DRAM) or static RAM (SRAM), read-only memory (ROM), erasable programmable read-only memory (EPROM), electrically erasable programmable read-only memory (EEPROM), non-volatile RAM (NVRAM), and magneto-resistive random-access memory (MRAM). The above memory types are for example only, and are thus not limiting as to the types of memory usable for storage of a computer program.

Figure 5:
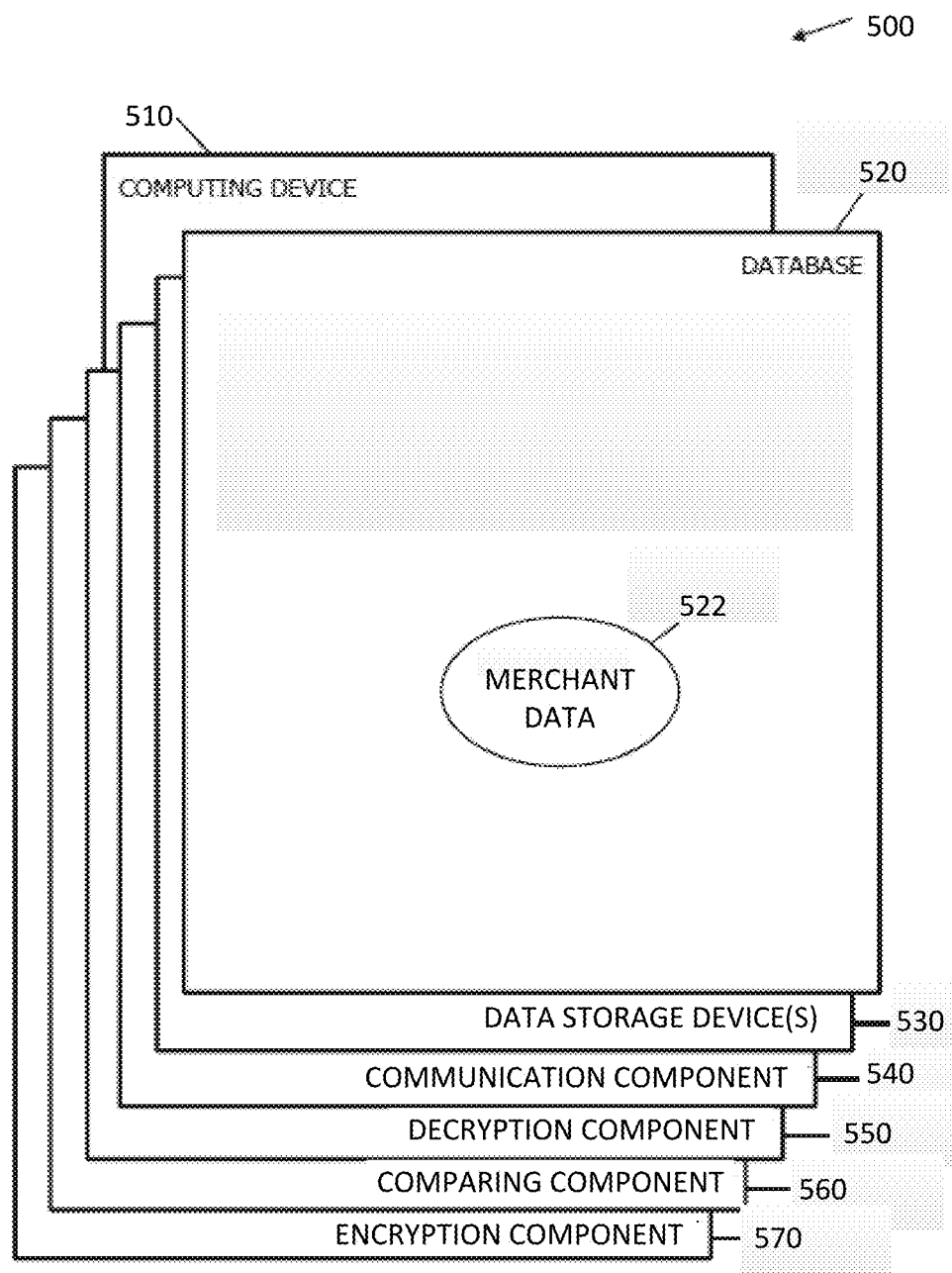
FIG. 5 shows a diagram of components of an example computing device that may be used in the system shown in FIG. 1.

FIG. 5 is a diagram 500 of components of one or more example computing devices that may be used in system 100 shown in FIG. 1. In some embodiments, computing device 510 is used to implement TAE computing device 140 (shown in FIG. 1). Computing device 510 may include a database 520 and a data storage device 530. Database 520 may be coupled with several separate components within computing device 510, which perform specific tasks. In this embodiment, database 520 includes merchant data 522. In some embodiments, database 520 is used to implement database 142 (shown in FIG. 1).

Computing device 510 includes a communication component 540 for retrieving a token 212 associated with a PAN 220 of a user (e.g., user 122 shown in FIG. 1) and receiving confirmation message 222 from a payment processor indicating a payment using PAN 220 was made in response to a merchant receiving token 212. Computing device 510 also includes a decryption component 550 for receiving, through a landline (e.g., landline 138 shown in FIG. 1), from a merchant (e.g., merchant 124 shown in FIG. 1) in response to transaction request (e.g., audio signal 202) by the user, merchant identification message 204 including a merchant identifier, and extracting the merchant identifier from merchant identification message 204. Computing device 510 also includes a comparing component 560 for querying database 520 of merchant data 522 including a plurality of merchants and a plurality of merchant identifiers, wherein each of the plurality of merchant identifiers corresponds to one of the plurality of merchants, and identifying, in response to the query, the merchant by matching the extracted merchant identifier against the plurality of merchant identifiers in database 520. Computing device 510 also includes an encryption component 570 for generating token message 214, transmittable through a landline and including token 212, and transmitting token message 214 to the merchant through the landline.

Figure 6:
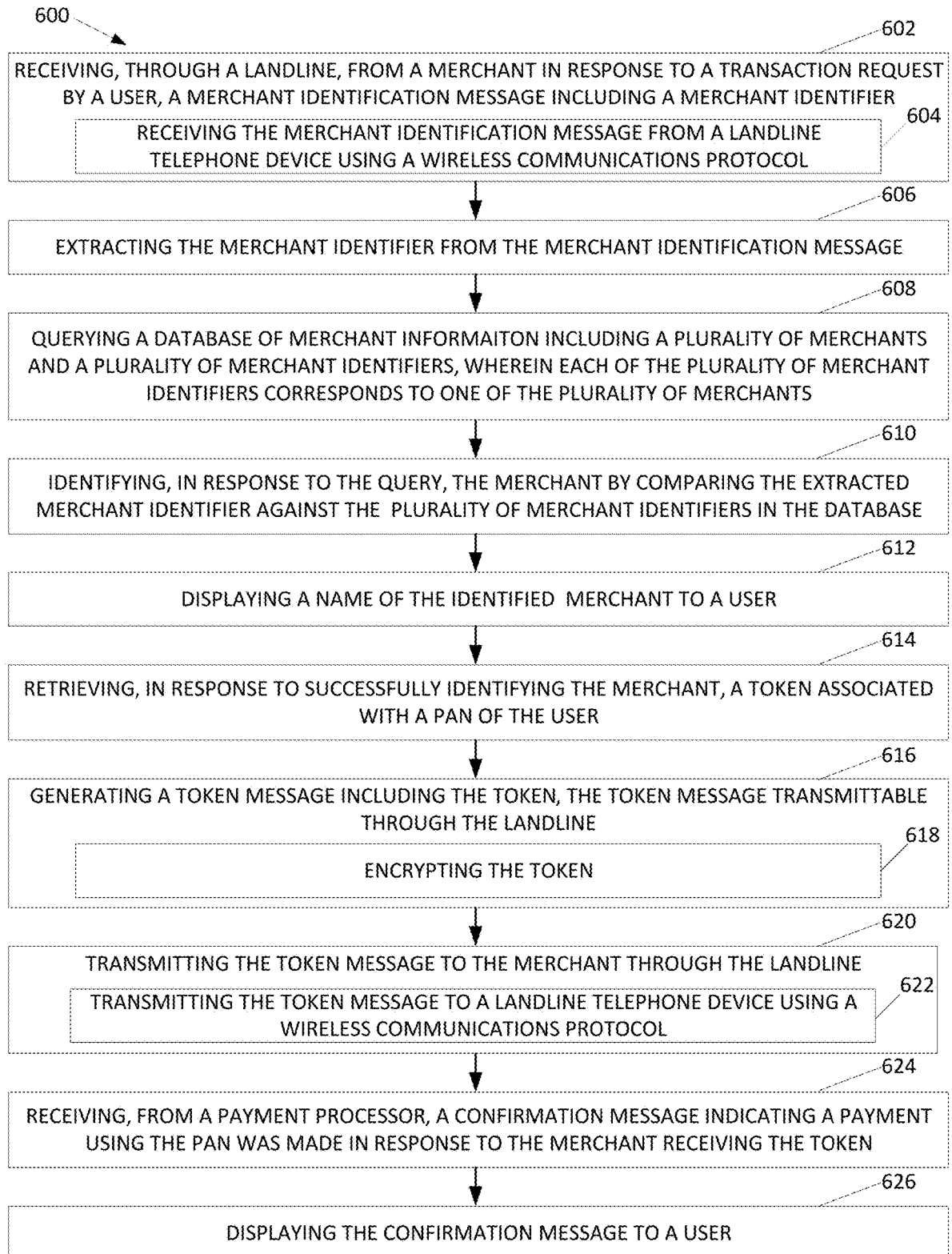
FIG. 6 is a flowchart illustrating an example method for securely transacting over a landline.

FIG. 6 is a flowchart illustrating an example method 600 for securely transacting over a landline, which may be implemented utilizing payment system 120 (shown in FIG. 1). More specifically, in some embodiments, method 600 may be implemented by a computing device, for example, TAE computing device 140 (shown in FIG. 1).

With reference also to FIG. 2, in the example embodiment, method 600 includes receiving 602, through a land line, from a merchant in response to a transaction request (e.g., audio signal 202) by a user, a merchant identification message 204 including a merchant identifier. In some embodiments, method 600 further includes receiving 604 merchant identification message 204 from a landline telephone device using a wireless communications protocol. In certain such embodiments, the wireless communications protocol is a Bluetooth protocol.

In the example embodiment, method 600 further includes extracting 606 the merchant identifier from merchant identification message 204. In some embodiments, merchant identification message 204 is of at least one of a frequency shift keying (FSK) protocol or a dual-tone multi-frequency (DTMF) protocol.

In the example embodiment, method 600 further includes querying 608 a database of merchant data including a plurality of merchants and a plurality of merchant identifiers, wherein each of the plurality of merchant identifiers corresponds to one of the plurality of merchants.

In the example embodiment, method 600 further includes identifying 610, in response to the query 608, the merchant by matching the extracted merchant identifier against the plurality of merchant identifiers in the database. In some embodiments, method 600 further includes displaying 612 a name of the identified merchant to the user.

In the example embodiment, method 600 further includes retrieving 614, in response to successfully identifying the merchant, a token 212 associated with a primary account number PAN 220 of the user. For example, token 212 may be retrieved from a token server associated with a payment processor or third party.

In the example embodiment, method 600 further includes generating 616 a token message 214 including token 212. Token message 214 is transmittable through the landline. In some embodiments, method 600 further includes encrypting 618 token 212. In certain embodiments, token message 214 is of at least one of a frequency shift keying (FSK) protocol or a dual-tone multi-frequency (DTMF) protocol.

In the example embodiment, method 600 further includes transmitting 620 token message 214 to the merchant through the landline. In some embodiments, method 600 further includes transmitting 622 token message 214 to a landline telephone device using a wireless communications protocol. In certain such embodiments, the wireless communications protocol is a Bluetooth protocol.

In the example embodiment, method 600 further includes receiving 624, from a payment processor, a confirmation message 222 indicating a payment using PAN 220 was made in response to the merchant receiving token 212. In some embodiments, method 600 may further include displaying 626 confirmation message 222 to the user.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As will be appreciated based on the foregoing specification, the above-described embodiments of the disclosure may be implemented using computer programming or engineering techniques including computer software, firmware, hardware or any combination or subset thereof, wherein the technical effect is a flexible system for various aspects of fraud analysis of payment card transactions. Any such resulting program, having computer-readable code means, may be embodied or provided within one or more computer-readable media, thereby making a computer program product, i.e., an article of manufacture, according to the discussed embodiments of the disclosure. The article of manufacture containing the computer code may be made and/or used by executing the code directly from one medium, by copying the code from one medium to another medium, or by transmitting the code over a network.

In addition, although various elements of the TAE computing device are described herein as including general processing and memory devices, it should be understood that the TAE computing device is a specialized computer configured to perform the steps described herein for securely transacting over a landline.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial locational differences from the literal language of the claims.

According to the advantageous systems and methods described herein, a user may verify in real time the identity of a merchant with whom the user is speaking during a landline telephone call. Additionally, user may make a card payment through a landline telephone call without the user verbally reading the user's primary account number (PAN) during the call.

What is claimed is:

1. A computing device for securely transacting over a landline, the computing device comprising at least one processor and a memory device in communication with the at least one processor, the at least one processor configured to:
   receive, from a landline telephone device as a first wireless signal, a first audio signal comprising a merchant identification message transmitted from a merchant through a landline in response to a transaction request by a user, the merchant identification message including a merchant identifier;
   extract the merchant identifier from the merchant identification message;
   query a database of merchant data including a plurality of merchants and a plurality of merchant identifiers, wherein each of the plurality of merchant identifiers corresponds to one of the plurality of merchants;
   identify, in response to the query, the merchant by matching the extracted merchant identifier against the plurality of merchant identifiers in the database;
   retrieve, in response to successfully identifying the merchant, a token associated with a primary account number (PAN) of the user;
   generate a token message including the token, the token message transmittable through the landline;
   transmit the token message to the landline telephone device as a second wireless signal, the landline telephone device configured to transmit the token message to the merchant as a second audio signal via the landline; and receive, from a payment processor, a confirmation message indicating a payment using the PAN was made in response to the merchant receiving the token in the token message.

2. The computing device of claim 1, wherein the processor is further configured to transmit the second wireless signal as a digital audio signal according to a wireless communications protocol.

3. The computing device of claim 2, wherein the wireless communications protocol is a Bluetooth protocol.

4. The computing device of claim 1, wherein the first audio signal is encoded in at least one of a frequency shift keying (FSK) protocol or a dual-tone multi-frequency (DTMF) protocol.

5. The computing device of claim 1, wherein the processor is further configured to display a name of the identified merchant to the user.

6. The computing device of claim 1, wherein to generate the token message, the processor is configured to encrypt the token.

7. The computing device of claim 1, wherein the processor is further configured to transmit the second wireless signal according to at least one of a frequency shift keying (FSK) protocol or a dual-tone multi-frequency (DTMF) protocol.

8. The computing device of claim 6, wherein the processor is further configured to, as part of generating the token message, encrypt the token into one of a numeric or an alphanumeric value using an encryption protocol.

9. The computing device of claim 1, wherein the merchant identifier comprises one of a number or an alphanumeric code associated with the merchant in the database.

10. The computing device of claim 1, wherein the processor is further configured to display the confirmation message to the user.

11. A computer-implemented method for securely transacting over a landline, said computer-implemented method implemented by a tokenization, analysis, and encryption (TAE) computing device including at least one processor in communication with a memory device, said computer-implemented method comprising:
receiving, by the TAE computing device, from a landline telephone device as a first wireless signal, a first audio signal comprising a merchant identification message transmitted from a merchant through a landline in response to a transaction request by a user, the merchant identification message including a merchant identifier;
extracting, by the TAE computing device, the merchant identifier from the merchant identification message;
querying, by the TAE computing device, a database of merchant data including a plurality of merchants and a plurality of merchant identifiers, wherein each of the plurality of merchant identifiers corresponds to one of the plurality of merchants;
identifying, by the TAE computing device, in response to the query, the merchant by matching the extracted merchant identifier against the plurality of merchant identifiers in the database;
retrieving, by the TAE computing device, in response to successfully identifying the merchant, a token associated with a primary account number (PAN) of the user;
generating, by the TAE computing device, a token message including the token, the token message transmittable through the landline;
transmitting, by the TAE computing device, the token message to the landline telephone device as a second wireless signal, the landline telephone device configured to transmit the token message to the merchant as a second audio signal via the landline; and
receiving, by the TAE computing device, from a payment processor, a confirmation message indicating a payment using the PAN was made in response to the merchant receiving the token in the token message.

12. The computer-implemented method of claim 11, wherein the first audio signal is encoded in at least one of a frequency shift keying (FSK) protocol or a dual-tone multi-frequency (DTMF) protocol.

13. The computer-implemented method of claim 11 further comprising displaying, by the TAE computing device, a name of the identified merchant to the user.

14. The computer-implemented method of claim 11, wherein generating the token message comprises encrypting, by the TAE computing device, the token.

15. The computer-implemented method of claim 11, wherein transmitting the second wireless signal to the landline telephone devices comprises transmitting, by the TAE computing device, the second wireless signal to the landline telephone device as a digital audio signal according to a wireless communications protocol.

16. The computer-implemented method of claim 11 further comprising displaying, by the TAE computing device, the confirmation message to the user.

17. A non-transitory computer-readable media having computer-readable instructions embodied thereon, wherein when executed by a tokenization, analysis, and encryption (TAE) computing device including at least one processor in communication with a memory device, the computer-readable instructions cause the TAE computing device to:
receive, from a landline telephone device as a first wireless signal, a first audio signal comprising a merchant identification message transmitted from a merchant through a landline in response to a transaction request by a user, the merchant identification message including a merchant identifier;
extract the merchant identifier from the merchant identification message;
query a database of merchant data including a plurality of merchants and a plurality of merchant identifiers, wherein each of the plurality of merchant identifiers corresponds to one of the plurality of merchants;
identify, in response to the query, the merchant by matching the extracted merchant identifier against the plurality of merchant identifiers in the database;
retrieve, in response to successfully identifying the merchant, a token associated with a primary account number (PAN) of the user;
generate a token message including the token, the token message transmittable through the landline;
transmit the token message to the landline telephone device as a second wireless signal, the landline telephone device configured to transmit the token message to the merchant as a second audio signal via the landline; and
receive, from a payment processor, a confirmation message indicating a payment using the PAN was made in response to the merchant receiving the token in the token message.

18. The non-transitory computer-readable media of claim 17, wherein the first audio signal is encoded in at least one of a frequency shift keying (FSK) protocol or a dual-tone multi-frequency (DTMF) protocol.

19. The non-transitory computer-readable media of claim 17, wherein to generate the token message, the computer-readable instructions cause the TAE computing device to encrypt the token.

20. The non-transitory computer-readable media of claim 17, wherein the computer-readable instructions cause the TAE computing device to transmit the second wireless signal as a digital audio signal according to a wireless communications protocol.

* * * * *